US009245662B2

(12) United States Patent
Nara et al.

(10) Patent No.: US 9,245,662 B2
(45) Date of Patent: Jan. 26, 2016

(54) ELECTROCONDUCTIVE PARTICLES

(71) Applicant: Mitsui Mining & Smelting Co., Ltd., Tokyo (JP)

(72) Inventors: Akihiro Nara, Yamaguchi (JP); Hiroyuki Iseki, Yamaguchi (JP); Takahiko Sakaue, Yamaguchi (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 113 days.

(21) Appl. No.: 13/971,318

(22) Filed: Aug. 20, 2013

(65) Prior Publication Data

US 2014/0077136 A1    Mar. 20, 2014

(30) Foreign Application Priority Data

Sep. 14, 2012   (JP) .................. 2012-203312

(51) Int. Cl.

| H01B 1/08 | (2006.01) |
| C09D 5/24 | (2006.01) |
| H01B 1/02 | (2006.01) |
| C09C 1/36 | (2006.01) |
| C09C 1/40 | (2006.01) |
| C09C 1/02 | (2006.01) |
| C09C 1/30 | (2006.01) |

(52) U.S. Cl.
CPC *H01B 1/08* (2013.01); *C09C 1/027* (2013.01); *C09C 1/3054* (2013.01); *C09C 1/3661* (2013.01); *C09C 1/407* (2013.01); *C09D 5/24* (2013.01); *H01B 1/02* (2013.01); *C01P 2002/60* (2013.01); *C01P 2004/32* (2013.01); *C01P 2004/62* (2013.01); *C01P 2006/10* (2013.01); *C01P 2006/40* (2013.01); *C01P 2006/62* (2013.01); *C01P 2006/63* (2013.01); *C01P 2006/64* (2013.01)

(58) Field of Classification Search
CPC .............. H01B 1/08; H01B 1/14; H01B 1/20; B32B 33/00
See application file for complete search history.

(56) References Cited

U.S. PATENT DOCUMENTS 5,585,037 A * 12/1996 Linton ...................... 252/506

FOREIGN PATENT DOCUMENTS

| CN | 1385862 | 12/2002 |
| CN | 1652259 | 8/2005 |
| CN | 101123126 | 2/2008 |
| CN | 101929080 | 12/2010 |
| CN | 102214496 | 10/2011 |
| CN | 102583524 | 7/2012 |
| JP | 2007-331966 | 12/2007 |
| JP | 2011-253652 | 12/2011 |

OTHER PUBLICATIONS

Pal et al "Electrical properties of composites with tin-tin oxide core-shell nanostructure . . . ". J. Phys. D: Appl. Phys. 38 (2005) 3537-3542.*

* cited by examiner

*Primary Examiner* — Mark Kopec
(74) *Attorney, Agent, or Firm* — Young & Thompson

(57) ABSTRACT

An electroconductive particle having a core particle and a tin oxide-containing coating layer on the core particle. The tin oxide of the coating layer has a crystallite size of 70 to 200 Å. The electroconductive particle preferably has a ratio of $R_3$ to $R_1$ of 1 to 250, wherein $R_1$ and $R_3$ are respective surface resistivities of electroconductive films formed of a coating composition containing the electroconductive particle and prepared by 1-hour dispersing and 3-hour dispersing, respectively. The coating layer preferably comprises dopant element-free, electroconductive tin oxide.

16 Claims, 1 Drawing Sheet

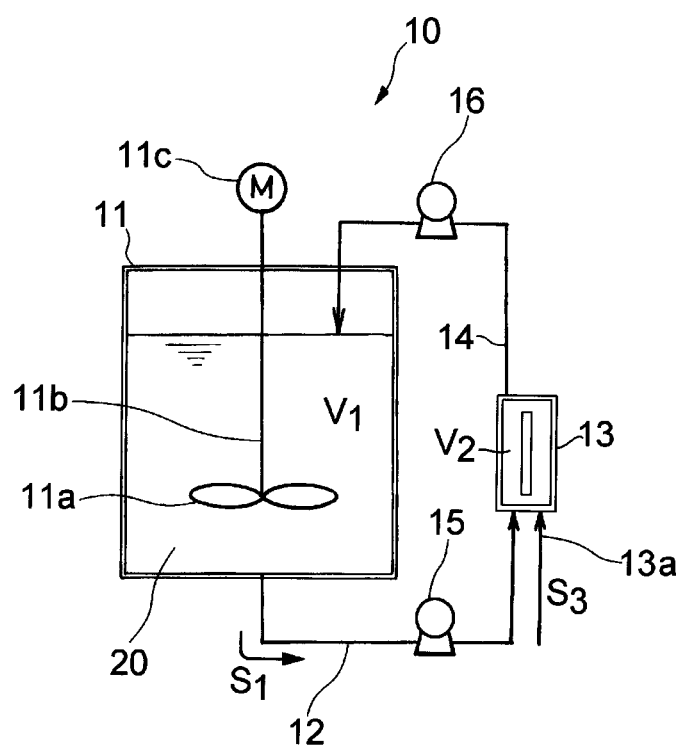

ELECTROCONDUCTIVE PARTICLES

TECHNICAL FIELD

This invention relates to an electroconductive particle having a coating layer containing tin oxide.

BACKGROUND ART

Known techniques relating to electroconductive tin oxide particles include those described in patent Literatures 1 and 2 below. Patent Literature 1 discloses fine particles of oxygen-deficient tin oxide having an oxygen to tin atomic ratio, O/Sn, of 1.75 to 1.95. The tin oxide particles are described as being free from antimony that imparts an undesirable black color to tin oxide and yet equal to antimony-containing tin oxide in electroconductivity. The tin oxide particles are obtained by mixing a tin compound solution with an acid or alkali aqueous solution, adding a phosphorus compound to the resultant reaction mixture to form a precipitate, washing, drying, and grinding the precipitate, and firing the resulting particles in the atmosphere.

Patent Literature 2 discloses white electroconductive powder composed of a particle of a complex oxide comprising $Al_2O_3$, $TiO_2$, and $SiO_2$ and an antimony-doped tin oxide layer on the surface of the particle. Patent Literature 2 describes the electroconductive powder as being excellent in electroconductivity and whiteness. The electroconductive powder is obtained by dispersing the complex oxide particles in water, adding dropwise to the resulting aqueous dispersion a mixed aqueous solution containing a tin source and an antimony source along with an alkali aqueous solution to precipitate an antimony-doped tin oxide compound on the surface of the complex oxide particles, and firing the particles in the atmosphere.

CITATION LIST

Patent Literature

Patent Literature 1: JP 2007-331966A
Patent Literature 2: JP 2011-253652A

SUMMARY OF INVENTION

Technical Problem

It is known that tin oxide tends to deteriorate in electroconductivity when placed in a severe environment, for example, under a high temperature and high humidity condition. Patent Literatures 1 and 2 give no considerations to prevention of such deterioration of electroconductivity in a severe environment.

An object of the invention is to provide an electroconductive particle free from various disadvantages associated with the above described conventional techniques.

Solution to Problem

The invention provides an electroconductive particle having a core particle and a tin oxide-containing coating layer on the core particle. The tin oxide of the coating layer has a crystallite size of 70 to 200 Å.

Advantageous Effects of Invention

The electroconductive particles of the invention, when formed into an electroconductive film, are prevented from deteriorating in electroconductivity even when placed in a severe environment, for example, under a high temperature and high humidity condition.

BRIEF DESCRIPTION OF DRAWINGS

FIG. 1 schematically illustrates an apparatus that is suitably used to carry out a preferred process for producing the electroconductive particles of the invention.

DESCRIPTION OF EMBODIMENTS

As used herein, the term "electroconductive particles" is intended to mean individual particles or particles taken together in unison according to the context. The electroconductive particle of the invention includes a core particle and an electroconductive coating layer on (or over) the surface of the core particle. The core particle constitutes a major portion of the electroconductive particle, and the coating layer is located on the outermost surface of the electroconductive particle to develop electroconductivity. The coating layer may be formed either directly on the core particle or indirectly via one or more other layers. The coating layer is preferably made of electroconductive tin oxide free from a dopant element.

The core particle may be of either an inorganic or an organic material. Examples of suitable inorganic materials include oxides, nitrides, and carbides of various elements, such as metallic elements; and salts of various elements, such as metallic elements. Examples of suitable organic materials include polymers of various kinds. The core particle may be water soluble or water insoluble. Considerations being given to the hereinafter described preferred process for producing the electroconductive particles of the invention, it is advantageous for the core particle to be water insoluble. Examples of preferred materials of the core particle include metal oxides, such as titanium oxide, alumina, and silica; and metal salts, such as barium sulfate. The core particle may be either electrically conductive or nonconductive. As used herein, the term "nonconductive" is intended to mean to have, for example, a resistivity of $10^5$ Ω·cm or higher.

The core particle is usually spherical or polyhedral. Core particles of other shapes, such as flaky particles, may also be used. Because the thickness of the coating layer formed on the core particle is sufficiently smaller than that of the core particle as will be described later, the core particle and the electroconductive particle are regarded as being equal in shape.

The core particle size is decided as appropriate to an intended use of the electroconductive particles. For example, for use as an electroconductive filler that is to be added to a coating composition to impart electroconductivity, the average primary particle size of the core particle is preferably 30 to 500 nm, more preferably 30 to 280 nm, even more preferably 30 to 250 nm. The average primary particle size is determined by measuring the length of at least 100 core particles in a field of view under an electron microscope and calculating the average.

The coating layer covering the core particle contains tin oxide, may contain a component other than tin oxide, and exhibits electroconductivity. The coating layer may cover the surface of the core particle continuously so that the surface of the core particle is not exposed. Alternatively, the coating layer may cover the surface of the core particle discontinuously so that a part of the surface of the core particle is exposed. That is, the percent coverage of the surface by the coating layer does not always need to be 100% and is preferably at least 50%. To ensure the electroconductivity, it is advantageous for the coating layer to continuously cover the entire surface of the core particle so that the surface of the core particle is not exposed.

The coating layer does not need to be thicker than necessary. It suffices for the coating layer to have a thickness enough to exhibit sufficient electroconductivity. The thickness of the coating layer, being expressed in terms of tin oxide content, is preferably such that the electroconductive particle may have a tin oxide content of 15 mass % or more, more preferably 20 to 60 mass %. The ratio of tin oxide to the total mass of the electroconductive particles is determined by totally dissolving the electroconductive particles, obtaining the content of tin using an ICP atomic emission spectrometer, and converting the tin content to a tin oxide content based on the molecular weight.

The electroconductive particles of the invention are characterized by their high dispersibility. Because of this characteristic, the particles provide an electroconductive film loaded with the particles at a high loading ratio and thereby exhibiting increased electroconductivity. The high loading ratio is effective in preventing the electroconductive film from deteriorating in electroconductivity even when the film is placed in a severe environment, such as a high temperature and high humidity environment. As a result of the inventors' intensive investigations on the dispersibility characteristics of the electroconductive particles of the invention, the crystallinity of the tin oxide present in the coating layer has been found associated with the dispersibility. Specifically, it has been revealed that the electroconductive particles show good dispersibility when the tin oxide in the coating layer has a crystallite size of 70 to 200 Å. The crystallite size is preferably 72 to 200 Å, more preferably 75 to 200 Å. Tin oxide with its crystallite size falling within that range can be obtained by the hereinafter described process for producing the electroconductive particles, in which tin hydroxide is synthesized in an ultrasonicated reaction system and the tin hydroxide is fired to produce tin oxide in an weakly reducing or non-oxidative firing atmosphere to control the oxygen vacancy concentration. In the invention the tin oxide crystallite size was determined from Williamson-Hall plots of powder XRD data obtained using a powder XRD system available from Rigaku Corp.

The inventors have also discovered that, the higher the crystallinity of the tin oxide in the coating layer is, the more is the resulting electroconductive film prevented from deteriorating in electroconductivity when placed in a high temperature and high humidity environment. The crystallinity of tin oxide is evaluated using measurement of crystallite size. Specifically, tin oxide with a larger crystallite size has higher crystallinity. From this viewpoint, too, it is preferred for the tin oxide to have a crystallite size falling in the range recited above.

As stated, the electroconductive particles of the invention have high dispersibility. The dispersibility of the electroconductive particles may be indicated by the change of surface resistivity of an electroconductive film formed by using a coating composition containing the electroconductive particles. More specifically, two electroconductive films are formed using respective coating compositions prepared in the same manner except for the dispersing time, and a ratio of surface resistivities of the two films is obtained. The surface resistivity ratio reflects the loadability of the electroconductive particles into the film attributed to the degree of dispersion and is therefore appropriate as a measure of dispersibility. The dispersing times to prepare the two coating compositions are set at 1 hour and 3 hours from the standpoint of the degree of dispersion and the surface resistivity. The surface resistivity of the film formed of a coating composition prepared by 1-hour dispersing being taken as $R_1$, and that of the film formed of a coating composition prepared by 3-hour dispersing being taken as $R_3$, the ratio, $R_3/R_1$, is preferably 1 to 250, more preferably 1 to 200, even more preferably 1 to 150. Electroconductive particles satisfying the above range of surface resistivity ratio are obtained by, for example, the hereinafter described process of production.

The electroconductive film subjected to the measurement of surface resistivity is formed as follows. A 50 ml volume plastic container is provided. In the container is put 7.41 g of electroconductive particles, and 9.64 g of a 7:3 by volume mixed solvent of toluene and n-butanol is then added thereto. To the container is further added 6.41 g of an acrylic coating resin Dianal LR-167 (composed of a resin component of about 46 mass % and the balance of a 7:3 by volume mixed solvent of toluene and n-butanol) from Mitsubishi Rayon Co., Ltd. The contents were dispersed on a paint shaker from Asada Iron Works, Co., Ltd. for 1 hour and 3 hours. The paint shaker is operated under standard operating conditions for a 60 Hz environment. About 1 ml of each of the resulting coating compositions is applied to a transparent OHP film of polyethylene terephthalate from Uchida Yoko Co., Ltd. using a #10 bar coater (Rod No. 10) from Tester Sangyo Co., Ltd. and dried in the atmosphere at 80° C. for 15 minutes to obtain an electroconductive film.

The respective surface resistivities $R_1$ and $R_3$ of the resulting electroconductive films are measured at a measuring voltage of 10 V using a resistometer Hiresta with an UP probe from Mitsubishi Chemical Analytech Co., Ltd.

In order to further increase the electroconductivity of the electroconductive film containing the electroconductive particles of the invention, the tin oxide of the coating layer may contain one or more of dopant elements known to be effective in enhancing the electroconductivity of tin oxide, such as Sb, Ta, W, and Nb. The tin oxide may, of course, be free of a dopant element. Although the electroconductivity of tin oxide increases by the doping, a dopant element, like Sb, can cause a large environmental burden or an economical disadvantage, so that the tin oxide is preferably free of a dopant element.

In the case of dopant-free tin oxide, electroconductivity of tin oxide generally owes to oxygen deficiency. The inventors' study has revealed that an electroconductive film that is further prevented from deteriorating in electroconductivity under a high temperature and high humidity condition is obtained by suppressing the amount of oxygen deficiency to a low level. In this connection, it is desirable to determine the amount of oxygen deficiency in tin oxide contained in the coating layer. It is not easy, however, to quantitatively determine the amount of oxygen deficiency of tin oxide. The amount of oxygen deficiency in tin oxide is empirically known in the art to be influential on the tint of tin oxide. Then, it is possible to represent the amount of oxygen deficiency of tin oxide in the coating layer of the electroconductive particle of the invention in terms of the tint of the electroconductive particle. Specifically, when defined by the CIE L*a*b* color space, the color of the electroconductive particle of the invention preferably has an L* value of 80 to 95, more preferably 83 to 93, an a* value of −2.0 to 2.0, more preferably −0.5 to 0.5, and a b* value of −2.0 to 10.0, more preferably −1.0 to 9.0.

To obtain a further increased loadability of the electroconductive particles of the invention into an electroconductive film, the electroconductive particles are preferably sufficiently small. Specifically, the average primary particle size of the electroconductive particles is preferably 30 to 500 nm, more preferably 30 to 280 nm, even more preferably 30 to 250 nm. The average primary particle size of the electroconductive particles is determined by measuring the length of at least 100 electroconductive particles in a field of view under an electron microscope and calculating the average. Electroconductive particles having the average primary particle size within the range recited can be obtained by using core particles whose primary particle size is within the range described supra and forming a tin oxide-containing coating layer on the core particle to the thickness described supra.

The electroconductive particles of the invention having characteristically high dispersibility not only provide a low-resistance electroconductive film but also have per se a low powder resistivity. The powder resistivity of the electroconductive particles of the invention is preferably $1.0 \times 10^0$ to $1.0 \times 10^4$ Ω·cm, more preferably $1.0 \times 10^0$ to $5.0 \times 10^3$ Ω·cm, measured at 25° C. using, for example, a powder resistivity measuring system PD-41 and a resistivity meter MCP-T600, both from Mitsubishi Chemical Corp. A sample weighing 15 g is put in a probe cylinder, and the probe unit is set on PD-41. A pressure of 500 f/kg is applied to the sample using a hydraulic jack, and the resistivity of the compacted powder is measured with MCP-T600. A powder (volume) resistivity is calculated from the measured ohmic value and the sample thickness.

The dispersibility of the electroconductive particles of the invention may also be evaluated based on the change of apparent density between different compression conditions. Similarly to the change in surface resistivity of electroconductive films, the change in apparent density of compressed powder reflects the loadability of the electroconductive particles in the electroconductive film and is therefore suitable as a measure of dispersibility. Pressures of 0.20 N/m$^2$ and 0.02 N/m$^2$ are adopted as a compression condition for calculating the change of apparent density. The pressure of 0.20 N/m$^2$ provides a high pressure condition, and the pressure of 0.02 N/m$^2$ provides a low pressure condition. In the case when titanium oxide is used as a core particle, the percent change of the apparent density A (g/cm$^3$) under the high pressure condition and the apparent density B (g/cm$^3$) under the low pressure condition, i.e., $(A-B)/A \times 100$, is preferably 0% to 20%, more preferably 10% to 20%, even more preferably 10% to 17%. In the case when barium sulfate is used as a core material, the above-defined percent change is preferably 0% to 26%, more preferably 20% to 26%, even more preferably 20% to 25.5%. Electroconductive particles satisfying the above range of apparent density change are obtained by, for example, the hereinafter described process of production.

A preferred process for producing the electroconductive particles of the invention will then be described. The electroconductive particles of the invention are preferably produced by a process including the steps of: circulating a mother liquid having core particles dispersed therein and a tin compound dissolved therein through a circulatory pathway provided with an ultrasonicator; feeding an acid or alkali to the ultrasonicator while circulating the mother liquid therethrough; causing the tin compound and the acid or alkali to react with each other while ultrasonicating the mother liquid in the ultrasonicator to form precursor particles having a coating layer of tin hydroxide on the surface of the core particles; and firing the precursor particles in a weakly reducing atmosphere or a non-oxidative atmosphere. FIG. 1 illustrates an apparatus 10 that is suitably used to carry out the process. The process will be described in more detail with reference to FIG. 1.

The apparatus 10 shown in FIG. 1 includes a mother liquid tank 11, a first circulatory pipe 12 coming from the bottom of the mother liquid tank 11, an ultrasonicator 13 connected to the outlet end of the first circulatory pipe 12, and a second circulatory pipe 14 coming from the outlet of the ultrasonicator 13 and entering the mother liquid tank 11, thereby to complete a circulatory pathway. A first pump 15 is provided intermediate the first circulatory pipe 12. A second pump 16 is provided intermediate the second circulatory pipe 14. Thus, the apparatus 10 has the mother liquid tank 11 and the ultrasonicator 13 arranged in tandem.

The mother liquid tank 11 is provided with a stirring blade 11a, which is connected to a motor 11c located outside the tank 11 via a shaft 11b. The motor 11c drives the shaft 11b to rotate the stirring blade 11a in a given direction.

The ultrasonicator 13 has one or more ultrasonic transducers (an ultrasonic horn). The transducer is placed in the circulatory pipes 12 and/or 14 and vibrated, whereby a mother liquid 20 and an acid or alkali are strongly dispersed. The ultrasonicator 13 is exemplified by a sonoreactor SR40L from Shinka Industry Co., Ltd. The ultrasonicator 13 preferably has a sufficiently small volume compared with the mother liquid tank 11.

Electroconductive particles of the invention are produced using the apparatus 10 as follows. The mother liquid tank 11 is filled with a mother liquid 20. The mother liquid 20 is a dispersion of core particles in a medium. The mother liquid 20 has a tin compound dissolved therein. As a medium, an appropriate liquid is selected according to the core particles, the reaction for coating layer formation, and the like. Generally, water is used as a medium.

The mixing ratio of the medium and the core particles is preferably 60 to 150 g, more preferably 80 to 120 g, of the core particles per liter of the medium. At this mixing ratio, a uniform coating layer of tin hydroxide is easily formed on the surface of the core particles. The tin compound concentration in the mother liquid 20 is preferably 1 to 20 mass %, more preferably 3 to 10 mass %, in terms of tin.

The tin compound is selected as appropriate to the medium. In using water as a medium, a water soluble tin compound, such as sodium stannate or tin tetrachloride, is used. The tin compounds may be used either individually or as a combination of two or more thereof.

After the mother liquid tank 11 is filled with a predetermined amount of the mother liquid 20, the stirring blade 11a in the mother liquid tank 11 is started to rotate to prevent the core particles from settling and to keep the mother liquid 20 homogeneous. Subsequently, the first pump 15, the ultrasonicator 13, and the second pump 16 are started up, thereby circulating the mother liquid 20 through the circulatory pathway formed in the apparatus 10.

When circulation of the mother liquid 20 through the circulatory pathway becomes steady, an acid or alkali, which is a reactant for the coating layer formation, is fed to the ultrasonicator 13 through a feed line 13a. The acid or alkali is to neutralize the tin compound dissolved in the mother liquid 20 to form a tin hydroxide layer on the core particles.

The neutralization reaction of the tin compound with the acid or alkali proceeds very rapidly. Therefore, if an acid or alkali is fed into a very large volume reactor containing a tin compound solution having the core particles dispersed therein to cause a neutralization reaction, the neutralization reaction occurs only locally at the site where the acid or alkali is fed even while stirring the reaction system, resulting in a failure to uniformly form a tin hydroxide coating layer on the core particles. Furthermore, because the tin hydroxide coating layer is soft, the particles adhere to one another via the coating layers to form agglomerates during the neutralization reaction. Unlike this, in the present embodiment of the process, because, for one thing, the neutralization takes place within the ultrasonicator 13 that is far smaller in volume than the mother liquid tank 11, and, for another, the mother liquid 20 is vigorously agitated by ultrasonication, local neutralization reaction is prevented from occurring so that a tin hydroxide coating layer is uniformly formed on the surface of the core particles. Ultrasonication also helps to form a dense layer of tin hydroxide. On firing, a dense tin hydroxide layer is converted to tin oxide with an increased crystallite size. Because the core particles are highly dispersed by ultrasonication, agglomeration of the particles is prevented effectively. This is particularly advantageous in using small-diameter core particles (e.g., with a particle size of 30 to 280 nm) that are liable to agglomerate. Additionally, since the mother liquid 20 is circulating in the circulatory pathway, it is possible to cause slow neutralization by feeding a reduced amount and/or concentration of the acid or alkali to the ultrasonicator 13, whereby a tin hydroxide coating layer is uniformly formed on the core particles, and the particles are prevented from agglomerating to maintain high dispersibility.

In the ultrasonicator 13 the reaction between the tin compound and the acid or alkali completes instantaneously. Therefore, it is utterly unlikely that the acid or alkali fed into the ultrasonicator 13 flows out into the circulatory pathway as unreacted and is accumulated in the circulating mother liquid to cause a neutralization reaction in other than the ultrasonicator 13. Even if such an inconvenience should occur, it would not be serious enough to influence the qualities of the product.

From the aspect of preventing local neutralization reaction effectively, it is desirable for the ultrasonicator 13 to have as small a volume as possible. On the other hand, the volume V2 of the ultrasonicator 13 is preferably as large as possible to secure a sufficient throughput. Taking these into consideration, the volume V2 of the ultrasonicator 13 is preferably 1 to 1000 $cm^3$, more preferably 10 to 500 $cm^3$.

From the same point of view, the transducer of the ultrasonicator 13 is preferably operated under conditions, such as an output energy of 300 to 2000 W at 10 to 40 kHz. A neutralization reaction is effectively prevented from occurring locally by employing such operating conditions.

The residence time of the mother liquid 20 and the acid or alkali in the ultrasonicator 13 is preferably as short as possible in order to prevent a local neutralization reaction from occurring. The flow rate of the mother liquid 20 flowing out of the mother liquid tank 11 and entering the ultrasonicator 13 being taken as S1 ($cm^3$/min), and the feed rate of the acid or alkali being fed into the ultrasonicator 13 being taken as S3 ($cm^3$/min), the time represented by V2/(S1+S3) is preferably 1 to 60 seconds, more preferably 30 to 60 seconds, in which V2 is the volume ($cm^3$) of the ultrasonicator 13.

The ratio of the acid or alkali to the mother liquid flowing into the ultrasonicator is related to prevention of local neutralization reaction in the ultrasonicator 13. It is preferred that the feed rate S3 of the acid or alkali being fed into the ultrasonicator 13 and the flow rate S1 of the mother liquid 20 flowing out of the mother liquid tank 11 and entering the ultrasonicator 13 be adjusted so that the ratio of S3 to S1, i.e., S3/S1, may be 0.01 to 0.05, more preferably 0.03 to 0.05. In other words, the amount of the acid or alkali to be fed is preferably by far smaller than the amount of the mother liquid 20 fed per unit time. Reducing the amount of the acid or alkali being fed is very effective in preventing a local neutralization reaction from occurring but negatively affects the rate of forming a tin hydroxide coating layer on the core particles. In the present embodiment, this negative aspect is eliminated by circulating the mother liquid 20.

When, for example, the flow rate S1 of the mother liquid 20 is 10 to 1000 $cm^3$/min, the feed rate S3 of the acid or alkali is preferably 0.3 to 50 $cm^3$/min, while varying with the throughputs.

To prevent local neutralization reaction in the ultrasonicator 13, it is also effective to lower the concentration of the acid or alkali to be fed in addition to, or instead of, reducing the amount of the acid or alkali to be fed. From this viewpoint, the acid or alkali concentration is preferably 1 to 25 N, more preferably 5 to 20 N, in terms of normality, provided that the concentration of the tin compound in the mother liquid 20 falls in the range recited above.

Examples of the acid fed to the ultrasonicator 13 include an aqueous solution of sulfuric acid, nitric acid, or acetic acid. Examples of the alkali include a sodium hydroxide aqueous solution and aqueous ammonia.

The feed of the acid or alkali to the ultrasonicator 13 may be either continuous or discontinuous. Continuous feed is preferred in the interests of forming a uniform tin hydroxide coating layer on the core particles. The feed may be carried out using, for example, a plunger pump.

The amount (feed rate) and/or the concentration of the acid or alkali to be fed may be varied (gradually increased or reduced) with time. For example, when in using a mother liquid tank 11 having a volume of several hundreds of cubic centimeters to several cubic meters, the amount to be fed may be varied gradually within a range of from 0.1 to 10 L/min, or the concentration may be varied gradually within a range of 1 to 50 mass %. By this manipulation, a local neutralization reaction is effectively prevented from occurring in the final stage of the reaction.

The time period of circulating the mother liquid is not particularly limited. The mother liquid may be circulated until a coating layer is formed to a desired thickness. As a result of the inventors' study, it has been ascertained that a coating layer with a satisfactory thickness is formed when the time T (min) from beginning to end of circulation satisfies the condition, in relation to the flow rate S1 and the volume V1 ($cm^3$) of the mother liquid put in the tank 11, that S1T/V1 is 5 or more, preferably 10 or more. The upper limit of S1T/V1 would be about a few hundred, up to which satisfactory results are obtained.

In order to more effectively prevent agglomeration among the particles having a tin hydroxide coating layer, it is advisable that the core particles be dispersed previously before the mother liquid, in which the core particles are dispersed, is charged into the mother liquid tank 11, and is circulated in the apparatus. Previously dispersing the core particles also offers the advantage that scaling-up of the apparatus is less likely to result in variations among the resulting electroconductive particles, thereby realizing higher-volume production. The dispersing operation is achieved by, for example, circulating a slurry containing the core particles and a medium such as water in the apparatus 10 with the ultrasonicator 13 operating.

Precursor particles having a tin hydroxide coating layer are thus obtained through the above operations. The precursor particles are then separated from the reaction system, washed, dried, and fired to provide electroconductive particles covered with tin oxide. Where needed, the resulting particles are ground to a desired particle size.

The firing is preferably carried out in a non-oxidative atmosphere. Examples of the non-oxidative atmosphere include non-oxidative and non-reducing atmospheres, such as a nitrogen or argon atmosphere; and a weakly reducing atmosphere that is a nitrogen atmosphere containing a small amount of hydrogen. Preferred of them is a nitrogen atmosphere containing a small amount of hydrogen, in which moderate oxygen deficiency is formed in the tin oxide. The hydrogen-containing nitrogen atmosphere preferably has a hydrogen concentration of 0.1 to 10 vol %, more preferably 1 to 3 vol %. Within that range of hydrogen concentration, a coating layer of electroconductive tin oxide with moderate oxygen deficiency is easily formed without involving reduction of tin to metallic tin.

The firing is preferably performed at a temperature of 200° to 1200° C., more preferably 400° to 600° C., for 5 to 180 minutes, more preferably 10 to 120 minutes. The firing temperature and time conditions recited are sufficient for generating oxygen deficiency and effective in preventing the particles from agglomerating. As a result of the firing, there are obtained the intended electroconductive particles.

The electroconductive particles of the invention may be compounded into paper, plastics, rubbers, resins, coatings, and so on to function as an electroconductive filler capable of imparting electroconductivity to the matrix material. The electroconductive particles may also be formulated into electroconductive compositions, such as electroconductive pastes and electroconductive inks. The electroconductive paste is prepared by compounding the electroconductive particles with a vehicle, a glass frit, and so on, and the electroconductive ink is prepared by compounding the electroconductive particles with a liquid medium, a surface tension modifier, and so forth.

EXAMPLE

The present invention will now be illustrated in greater detail with reference to Examples, but it should be understood that the invention is not limited thereto. Unless otherwise noted, all the percents are by mass.

Example 1

The apparatus illustrated in FIG. 1 was used. A dispersion of 1050 g of barium sulfate particles in 4000 cm$^3$ of pure water was put in the mother liquid tank 11 having a volume of 10000 cm$^3$. The barium sulfate particles were spherical with an average primary particle size of 150 nm. The liquid in the tank was made up to 9000 cm$^3$ by adding pure water. To the liquid was added 1080 g of sodium stannate. After the liquid temperature was raised up to 70° C., the apparatus was operated to circulate the liquid for 1 hour with the ultrasonicator 13 (SRT40-01 type, from Shinka Industry Co., Ltd.) turned on to carry out preliminary dispersion to prepare a mother liquid. The ultrasonicator was operated at an output of 570 W and a frequency of 40 kHz. Twenty percent concentration sulfuric acid was fed to the ultrasonicator 13 at a feed rate S3 of 20 cm$^3$/min while circulating the mother liquid at such a velocity that the flow rate S1 of the mother liquid flowing out of the mother liquid tank was 3000 cm$^3$/min. The volume of the ultrasonicator 13 was 3000 cm$^3$. The ultrasonicator 13 was operated at an output of 570 W and a frequency of 40 kHz. The sulfuric acid was fed to the ultrasonicator 13 continuously until the pH of the mother liquid became 2 to 4.

After the circulation was stopped, the liquid was aged for 1 hour while appropriately adding the sulfuric acid so as to maintain the liquid pH between 2 and 4. There was obtained a slurry containing tin hydroxide-coated barium sulfate particles. The slurry was washed by repulping until its electroconductivity decreased to 500 µS/cm or less and filtered through a Buchner funnel to obtain a wet cake. The wet cake was dried in the atmosphere at 150° C. for 10 hours, followed by grinding. The resulting powder was fired in a 1 vol % $H_2/N_2$ atmosphere at 450° C. for 30 minutes to yield dopant element-free, tin oxide-coated barium sulfate particles.

Comparative Example 1

Tin oxide-coated barium sulfate particles were obtained in the same manner as in Example 1, except that the ultrasonicator 13 was not operated.

Example 2

Dopant element-free, tin oxide-coated titanium oxide particles were obtained in the same manner as in Example 1, except for replacing the barium sulfate particles with titanium oxide particles and using 872 g of sodium stannate. The titanium oxide particles used were spherical with an average primary particle size of 160 nm.

Example 3

Dopant element-free, tin oxide-coated titanium oxide particles were obtained in the same manner as in Example 2, except for reducing the amount of sodium stannate to 694 g.

Comparative Example 2

Tin oxide-coated titanium oxide particles were obtained in the same manner as in Example 2, except that the ultrasonicator 13 was not operated.

Evaluation

The particles obtained in Examples and Comparative Examples were formulated into a coating composition, and an electroconductive film was made using the coating composition according to the method described supra. The resulting electroconductive film was evaluated by the surface resistivity ratio $R_3/R_1$ and the surface resistivity after it was allowed to stand in a high temperature and high humidity environment. The particles obtained in Examples and Comparative Examples were evaluated by the crystallite size of tin oxide, apparent density, percent change of apparent density, the ratio of tin in the electroconductive particles, L*a*b* values, average primary particle size, and powder resistivity. The apparent density, percent change of apparent density, L*a*b* values, and the surface resistivity after standing in a high temperature and high humidity environment were measured as follows. The other characteristics values were determined by the previously described methods. The results of evaluation are shown in Table 1 below.

(1) Apparent Density and Change in Apparent Density

Five grams of the electroconductive particles for the measurement of volume resistivity were weight out precisely and compressed. The apparent density was calculated from the compression area (3.14 cm$^2$) and the thickness of the compressed powder. The percent change in apparent density was obtained making use of the change in compressed powder thickness with the pressure applied.

(2) L*a*b* Values

The color of the electroconductive particles was represented by L*a*b* values according to the CIE 1976 L*a*b* color space using a spectrophotometer SE600 from Nippon Denshoku Industries Co., Ltd.

(3) Surface Resistivity of Electroconductive Film after Standing in High Temperature/High Humidity Environment An electroconductive film was made by the above described method in which the dispersing time was 3 hours.

The film was allowed to stand in a high temperature and high humidity environment of 60° C. and 90% RH for 30 days. Thereafter, the surface resistivity $R_{30}$ of the film was measured in the same manner as described supra. Then, a ratio of $R_{30}$ to $R_3$ ($R_{30}/R_3$), which is Factor of Increase, was obtained.

TABLE 1

| | Core Particle | Ultra-sonication | Tin Oxide Crystallite Size (Å) | Film Surface Resistivity (Ω/□) | | | Dispersing Time of Coating Composition: 3 hours Standing in a high temperature and high humidity environment for 30 days | |
|---|---|---|---|---|---|---|---|---|
| | | | | 1 hour $R_1$ | 3 hours $R_3$ | $R_3/R_1$ | Surface Resistivity (Ω/□) | Factor of Increase |
| Ex. 1 | BaSO$_4$ | yes | 89.9 | $7.4 \times 10^5$ | $9.0 \times 10^7$ | 121 | $4.1 \times 10^9$ | 45 |
| Comp. Ex. 1 | BaSO$_4$ | no | 67.5 | $1.3 \times 10^7$ | $3.7 \times 10^9$ | 279 | $3.3 \times 10^{11}$ | 90 |
| Ex. 2 | TiO$_2$ | yes | 79.8 | $1.3 \times 10^6$ | $1.8 \times 10^8$ | 140 | $8.6 \times 10^9$ | 48 |
| Ex. 3 | TiO$_2$ | yes | 83.3 | $1.3 \times 10^7$ | $5.1 \times 10^8$ | 39 | $1.4 \times 10^{10}$ | 27 |
| Comp. Ex 2 | TiO$_2$ | no | 64.1 | $1.7 \times 10^7$ | $7.1 \times 10^9$ | 412 | $5.7 \times 10^{11}$ | 80 |

| | Apparent Density (g/cm$^3$) | | | Ratio of Tin Oxide (mass %) | L* | a* | b* | Primary Particle Size (nm) | Powder Resistivity (Ω·cm) |
|---|---|---|---|---|---|---|---|---|---|
| | 0.20 N/m$^2$ | 0.02 N/m$^2$ | Change (%) | | | | | | |
| Ex. 1 | 2.35 | 1.76 | 25.1 | 40 | 83.4 | −0.4 | 7.4 | 202 | $2.7 \times 10^1$ |
| Comp. Ex. 1 | 2.32 | 1.70 | 26.7 | 40 | 83.3 | 0.6 | 6.6 | 204 | $6.7 \times 10^1$ |
| Ex. 2 | 2.07 | 1.73 | 16.4 | 35 | 90.1 | 0.1 | 0.6 | 199 | $2.3 \times 10^1$ |
| Ex. 3 | 1.96 | 1.71 | 12.8 | 30 | 86.7 | 0.1 | 5.3 | 195 | $3.2 \times 10^2$ |
| Comp. Ex 2 | 2.08 | 1.64 | 21.2 | 35 | 86.3 | −0.7 | 7.8 | 203 | $1.5 \times 10^2$ |

As is apparent from the results in Table 1, the electroconductive particles of Examples (of the invention) have a larger crystallite size than those of Comparative Examples, and the electroconductive films prepared using the electroconductive particles of Examples show a smaller increase in surface resistivity when allowed to stand in a high temperature and high humidity condition than those using the electroconductive particles of Comparative Examples, proving capable of maintaining electroconductivity.

The invention claimed is:

1. An electroconductive particle, comprising:
    a core particle comprising titanium oxide, barium sulfate, alumina, or silica; and
    a dopant element-free tin oxide-containing coating layer located on the core particle, the tin oxide of the coating layer having a crystallite size of 70 to 200 Å.

2. The electroconductive particle according to claim 1, wherein the core particle is titanium oxide, and the electroconductive particle shows an apparent density change represented by formula [(A−B)/A×100] of 0% to 20%, wherein A is an apparent density (g/cm$^3$) measured under a pressure of 0.20 N/m$^2$, and B is an apparent density (g/cm$^3$) measured under a pressure of 0.02 N/m$^2$.

3. The electroconductive particle according to claim 1, wherein the core particle is barium sulfate, and the electroconductive particle shows an apparent density change represented by formula [(A−B)/A×100] of 0% to 26%, wherein A is an apparent density (g/cm$^3$) measured under a pressure of 0.20 N/m$^2$, and B is an apparent density (g/cm$^3$) measured under a pressure of 0.02 N/m$^2$.

4. An electroconductive composition comprising the electroconductive particle according to claim 1.

5. The electroconductive particle according to claim 1, wherein the core particle has an average particle size of 30 to 500 nm.

6. The electroconductive particle according to claim 1, having a tin oxide content of 15 mass % or more.

7. The electroconductive particle according to claim 1, having a tin oxide content of 20 to 60 mass %.

8. The electroconductive particle according to claim 1, wherein the crystallite size is 72 to 200 Å.

9. The electroconductive particle according to claim 1, wherein an oxygen deficiency of the tin oxide is defined in terms of tint in CIE L*a*b* color space where L* has a value of 80 to 95, a* has a value of −2.0 to 2.0 and b* has a value of −2.0 to 10.0.

10. The electroconductive particle according to claim 1, wherein an oxygen deficiency of the tin oxide is defined in terms of tint in CIE L*a*b* color space where L* has a value of 83 to 93, a* has a value of −0.5 to 0.5 and b* has a value of −1.0 to 9.0.

11. The electro conductive particle according to claim 1, having a ratio of $R_3$ to $R_1$ of 1 to 250, wherein $R_1$ is a surface resistivity of an electroconductive film formed of a coating composition containing the electroconductive particle and prepared by 1-hour dispersing, and $R_3$ is a surface resistivity of an electroconductive film formed of a coating composition containing the electroconductive particle and prepared by 3-hour dispersing.

12. An electroconductive particle, comprising:
    a core particle comprising titanium oxide, barium sulfate, alumina, or silica; and
    a dopant element-free tin oxide-containing coating layer located on the core particle, the tin oxide of the coating layer having a crystallite size of 75 to 200 Å.

13. The electroconductive particle according to claim 12, wherein the core particle is titanium oxide, and the electroconductive particle shows an apparent density change represented by formula [(A−B)/A×100] of 0% to 20%, wherein A is an apparent density (g/cm$^3$) measured under a pressure of $0.20 \text{ N/m}^2$, and B is an apparent density ($\text{g/cm}^3$) measured under a pressure of $0.02 \text{ N/m}^2$.

14. The electroconductive particle according to claim 12, wherein the core particle is barium sulfate, and the electroconductive particle shows an apparent density change represented by formula $[(A-B)/A \times 100]$ of 0% to 26%, wherein A is an apparent density ($\text{g/cm}^3$) measured under a pressure of $0.20 \text{ N/m}^2$, and B is an apparent density ($\text{g/cm}^3$) measured under a pressure of $0.02 \text{ N/m}^2$.

15. The electroconductive particle according to claim 12, wherein an oxygen deficiency of the tin oxide is defined in terms of tint in CIE $L^*a^*b^*$ color space where $L^*$ has a value of 80 to 95, $a^*$ has a value of $-2.0$ to $2.0$ and $b^*$ has a value of $-2.0$ to $10.0$.

16. The electroconductive particle according to claim 15, having a ratio of $R_3$ to $R_1$ of 1 to 250, wherein $R_1$ is a surface resistivity of an electroconductive film formed of a coating composition containing the electroconductive particle and prepared by 1-hour dispersing, and $R_3$ is a surface resistivity of an electroconductive film formed of a coating composition containing the electroconductive particle and prepared by 3-hour dispersing.

* * * * *